(12) United States Patent
Darrelmann et al.

(10) Patent No.: US 6,424,057 B1
(45) Date of Patent: Jul. 23, 2002

(54) UNINTERRUPTIBLE POWER SUPPLY (UPS) SYSTEM WITH PRIMARY AIR COOLING

(75) Inventors: Hilmar Darrelmann; Ralf Briest; Norbert Ueffing, all of Osterode (DE)

(73) Assignee: Piller GmbH, Osterode (DE)

( * ) Notice: Subject to any disclaimer, the term of this patent is extended or adjusted under 35 U.S.C. 154(b) by 29 days.

(21) Appl. No.: 09/606,615

(22) Filed: Jun. 29, 2000

(30) Foreign Application Priority Data

Jun. 30, 1999 (EP) .............................................. 99112434

(51) Int. Cl.[7] .................................................. H02J 1/00
(52) U.S. Cl. .............................. 307/86; 307/43; 307/64; 361/690; 361/103; 165/41
(58) Field of Search .............................. 307/86, 43, 64; 257/691; 361/690, 699, 103; 165/104.33, 41, 47; 62/238.6

(56) References Cited

U.S. PATENT DOCUMENTS

| 4,580,071 A | | 4/1986 | Nakayama ................... 310/62 |
| 6,041,850 A | * | 3/2000 | Esser et al. ............ 165/104.33 |
| 6,105,875 A | * | 8/2000 | LaGrotta et al. .......... 236/44 A |
| 6,130,818 A | * | 10/2000 | Severson .................... 361/690 |

FOREIGN PATENT DOCUMENTS

| CH | 109 778 A | 4/1924 |
| DE | 18 13 592 A | 12/1968 |

* cited by examiner

Primary Examiner—Kim Huynh
Assistant Examiner—Robert L. Deberadinis
(74) Attorney, Agent, or Firm—Thomas, Kayden, Horstemeyer & Risley

(57) ABSTRACT

An uninterruptible power supply (UPS) system (3) is to be inserted between a alternating current (AC) power supply (4), interruptions of which are to be compensated for, and at least one load (5), which is to be supplied with alternating current (AC) or direct current (DC). The system comprises a housing (6); at least one electrical or electronic component (14–16), located within the housing (6), electric energy being partially transformed into heat energy upon a power current flowing through said electrical or electronic component (14–16); cooling air transport means (20) for sucking cooling air (21) into the housing (6), for circulating the cooling air (21) within the housing (6) and for blowing the cooling air (21) out of said housing (6) to remove the heat energy; a passive heat exchanger (7) for withdrawing the heat energy from the cooling air (21) being blown out of said housing (6) and for transferring the heat energy into another cooling medium; and control means (17) switching the UPS system (3) from a first operation mode into a second operation mode, when a temperature sensor (22) at the heat exchanger (7) detects a temperature which is above a predetermined threshold value. In the first operation mode of the UPS system (3), the cooling air (21) blown out of said housing (6) enters said passive heat exchanger (7), and is then sucked out of the heat exchanger back (7) into the housing (6); said housing (6), said heat exchanger (7) and any pipes (8) inserted there between being sealed against the surroundings (28) in the first operation mode. And in the second operation mode of the UPS system (3) the cooling air (21) is blown out of the housing (6) into the surroundings (28) of the housing (6) and then being sucked out of the surroundings (28) of the housing (6) back into the housing (6). According to the invention said housing (6) and said heat exchanger (7) are located within an inner room (1) of a building, the surroundings (28) of the housing (6) being limited to the volume of the inner room (1), and said heat exchanger (7) is connected to a standard heat removal system of the building (8–10).

9 Claims, 2 Drawing Sheets

UNINTERRUPTIBLE POWER SUPPLY (UPS) SYSTEM WITH PRIMARY AIR COOLING

FIELD OF THE INVENTION

The invention relates to an uninterruptible power supply (UPS) system to be inserted between a alternating current (AC) power supply, interruptions of which are to be compensated for, and at least one load, which is to be supplied with alternating current (AC) or direct current (DC). More particularly the invention relates to an UPS system comprising a housing; at least one electrical or electronic component located within the housing, electric energy being partially transformed into heat energy upon a power current flowing through said electrical or electronic component; cooling air transport means for sucking cooling air into the housing, for circulating the cooling air within the housing and for blowing the cooling air out of said housing to remove the heat energy; and a passive heat exchanger for withdrawing the heat energy from the cooling air being blown out of said housing and for transferring the heat energy to another cooling medium. Whether the primary AC power supply, interruptions of which are to be compensated for, supplies a two or a three phase current does not affect the present invention.

UPS systems are typically divided up into static UPS systems and dynamic UPS systems, static UPS systems compensating for interruptions of a AC power supply by means of electric energy stored in batteries whereas dynamic UPS systems use kinetic energy stored in a flywheel to this end. For providing this kinetic energy an electrical machine is permanently operated. It is operated as a motor as long as the AC power supply supplies current. Upon an interruption of the AC power supply the electrical machine is operated as a generator, to make use of the stored kinetic energy for supplying the load.

Principally, the present invention relates both to static and to dynamic UPS systems. The main application, however, are dynamic UPS systems.

BACKGROUND OF THE INVENTION

The electronic and electrical components of an UPS system through which a power current is flowing have to be cooled. Even in case of a high efficiency of the UPS system of 95 to 99%, the total power dissipated into heat in these components would heat up these components up to their self-destruction very soon.

In known UPS systems with air cooling the electrical and electronic components, air out of the surroundings of the housing containing the electrical and electronic components of the UPS system is sucked in, circulated within the housing for cooling the components and blown out again. In dynamic UPS systems it is known to provide a rotor of a permanently operated electrical machine through which a power current is flowing with air transport blades for circulating the air. In static UPS systems separately driven air transport means have to be provided.

If a known UPS system with simple air cooling of the electrical and electronic components is located in a closed inner room of a building, it is necessary to in turn cool the air within the inner room which serves as a cooling air reservoir for the UPS system. To this end, usually an air conditioning unit is provided for the inner room. In bigger buildings with air conditioning units in several rooms it is common that the heat is removed from several air conditioning units through a special cooling water system and transferred to the air in the surroundings of the building by means of a central heat exchanger.

In an UPS system with simple air cooling of the electrical and electronic components it is a known problem that in sucking in air out of the surroundings of the UPS system contaminations are also sucked into the housing. These contaminations may build up within the housing of the UPS system, and may thus result into thermal and/or electrical problems, like short circuits, for example, which may not only endanger the operation of the UPS system but also its whole substance. Critical contaminations of the air in the surroundings of the UPS system are not only present in polluted surroundings. For critical contaminations the salt content of the air in areas close to the sea can be sufficient, for example. Processing of the air sucked out of the surroundings into the housing of the UPS system would not only require additional technical and maintenance effort, but would also increase the dissipation of energy in the UPS system.

If an UPS system with simple air cooling of the electrical and electronic components is located in an closed inner room, the danger of contaminations building up within the housing of the UPS System is normally clearly reduced. Here, however, the necessary effort for providing the additional air conditioning unit for the inner room of the building has to be seen as an disadvantage.

A system comprising electrical machines provided in a housing with air cooling is known from published German Patent Application DE-18 13 592.7. Here, a heat exchanger is provided within the housing. Under regular operation conditions the housing is sealed against the surroundings of the system, and the cooling air is just circulated within the housing. This avoids that machine noise leaves the housing. When however, the temperature within the housing increases due to a failure of the heat exchanger in withdrawing the heat from the cooling air, an intake port of the housing is automatically opened and an outlet port of the housing is at the same time connected to an air removal channel through which the heated up cooling air is removed, whereas fresh cooling air is sucked in through the intake port out of the surroundings of the housing. This may allow contaminations to enter the housing but this is still better than having the electrical machines destroyed by overheating. Suitable air removal channels will however be seldom available in modern office buildings.

A similar system is described in Swiss Patent CH-109 778. This system requires both a fresh air channel and an air removal channel for operation, if the heat exchanger stops working properly.

Thus, a UPS system which could be operated within a closed inner room of a building, even if a cooling water system of the building breaks down, which especially may take place at the same time as the UPS system is most important, would be desirous.

SUMMARY OF THE INVENTION

The present invention provides an uninterruptible power supply system to be inserted between a alternating current power supply, interruptions of which are to be compensated for, and at least one load which is to be supplied with alternating current (AC) or direct current (DC). The system according to the invention comprises: a housing; at least one electrical or electronic component located within the housing, electric energy being partially transformed into heat energy upon a power current flowing through said electrical or electronic component; cooling air transport means for sucking cooling air into the housing, for circulating the cooling air within the housing and for blowing the cooling air out of said housing to remove the heat energy; a passive heat exchanger for withdrawing the heat energy from the cooling air being blown out of said housing and for transferring the heat energy into another cooling medium; and control means switching the system from a first operation mode into a second operation mode, when a temperature sensor at the heat exchanger detects a temperature which is above a predetermined threshold value; in the first operation mode of the system, the cooling air blown out of said housing entering said passive heat exchanger and then being sucked out of the heat exchanger back into the housing; said housing, said heat exchanger and any pipes inserted there between being sealed against the surroundings in the first operation mode; and in the second operation mode of the system the cooling air being blown out of the housing into the surroundings of the housing and then being sucked out of the surroundings of the housing back into the housing; wherein said housing and said heat exchanger are located within an inner room of a building, the surroundings of the housing being limited to the volume of the inner room; and wherein said heat exchanger is connected to a standard heat removal system of the building.

Die UPS system according to the invention is characterized by two main features. During the standard mode of operation of the UPS system, i.e. as long as the heat exchanger cools down the cooling air sufficiently, the cooling air is kept within a closed system sealed against the surroundings of the UPS. In this mode of operation, the cooling air enters the heat exchanger in leaving the housing with the electrical and electronic components through which a power current is flowing, and directly returns out of the heat exchanger into the housing. Thus, during the normal mode of operation of the UPS system, the cooling air can not carry any contaminations into the housing, which may build up over the time there. The heat exchanger which is, according to the invention, a passive one allows for transferring the heat energy, which is withdrawn from the cooling air again, to a cooling medium which may be easily removed out of the closed inner room of the building in which the UPS system is located. Particularly, the cooling medium may be a liquid which is led through a closed pipe system. On the other hand, the new UPS system comprises facilities for operation in an emergency operation mode, into which it is transferred, if the heat exchanger fails due to a technical defect within the heat exchanger itself or within its cooling medium supply. In this case, the control means of the new UPS system detect an increase in temperature exceeding a predetermined threshold value, and then transfer the UPS system into the emergency operation mode, in which the cooling air is blown out of the housing into the surroundings of the housing and sucked back from there into the housing. In doing this, it is accepted that contaminations enter the housing of the UPS system, however, only during the emergency operation mode. This emergency operation mode is typically limited to short intervals of time which are, for example, required to shut down a computer system connected as a load to the UPS system in a controlled manner. Afterwards, the UPS system typically switches off to avoid its self-destruction due to over-heating because the heat reception capacity of the air within a closed inner room of the building in which the UPS system is located is tightly limited. By means of the second mode of operation of the UPS system, its dependency of the heat exchanger is limited to such an extend which is equal to a dependency of a separate air conditioning unit within the inner room of the building in which the UPS system is located. A passive heat exchanger, however, has a much smaller failure rate and requires much lesser technical effort than an air conditioning unit.

Ideally, cooling water which is provided by a standard heat removal system of the whole building is used as the cooling medium for the heat exchanger. As already explained, such heat removal systems are provided in many buildings to remove heat energy from the air conditioning units within the single rooms of these buildings. The heat energy is then normally transferred to the air in the surroundings of the building by means of a central heat exchanger.

Ideal conditions for realizing the new UPS system are given in case of dynamic UPS systems in which a permanently operated electrical machine having a rotor and a stator is one component located within the housing through which a power current is flowing. In this case the rotor of the electrical machine can be provided with cooling air transport blades which are the only moving part of the cooling air transport means. These cooling air transport means avoid the necessity of an additional cooling air fan.

Preferably, the heat exchanger is located within a heat exchanger housing which is directly attached to the housing with said electrical or electronic component. I.e., the housing and the heat exchanger housing form one unit.

In a preferred embodiment of the new UPS system, the heat exchanger housing has, at the cooling air entering end, an intake port, and, at the cooling air leaving end, an outlet port. Both ports are openable and closable by said control means and lead into the surroundings of the housing. The cooling air ports enable that the cooling air bypasses the heat exchanger and circulates through the closed inner room of the building in that second mode of operating the new UPS system.

BRIEF DESCRIPTION OF THE DRAWINGS

In the following, the invention is described and explained in more detail by reference to the accompanying drawings in which.

Same reference numerals refer to same parts throughout the two views of the drawings.

DETAILED DESCRIPTION OF THE PREFERRED EMBODIMENT

Figure 1:
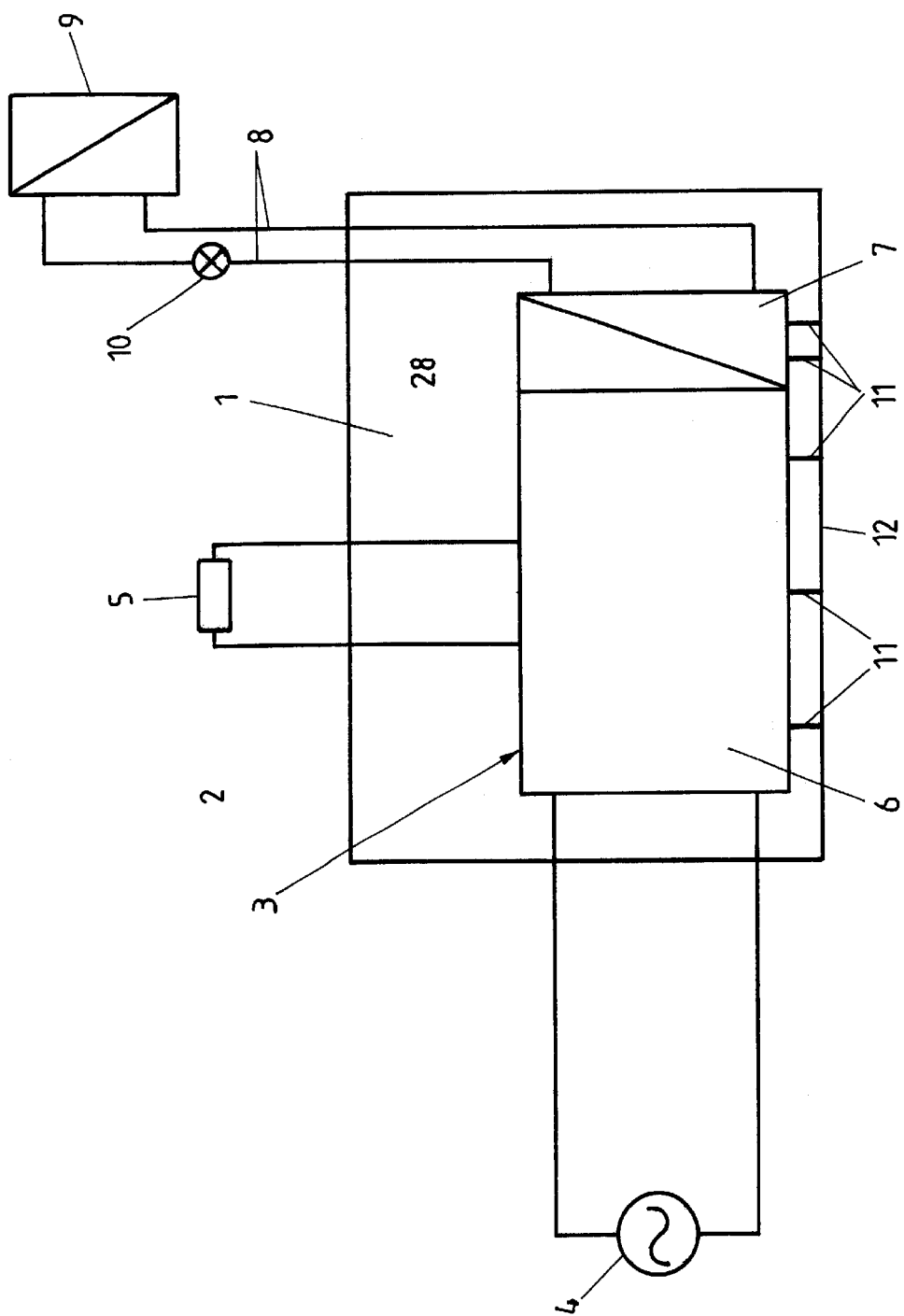
FIG. 1 illustrates an arrangement of the new UPS system in an inner room of a building.

FIG. 1 illustrates a closed inner room 1, which indicates a closed inner room of a building, for example, in the basement of the building. Closed inner room 1 has no permanent connection to air 2 in the surroundings of the building which would be suitable to provide sufficient cooling air for cooling an uninterruptible power supply (UPS) system 3 located in room 1. UPS system 3 serves for compensating for interruptions of a AC power supply 4 in supplying current to at least one electrical load 5. Normally, AC power supply 4 is a public power supply. Typically, load 5 is not located within inner room 1 but somewhere else within the respective building. UPS system 3 has a housing 6 in which a power currents flows through electrical and electronic components. This results in a part of the electric energy being dissipated into heat energy. Typically, the stray power is in an order of 2 to 3% of the whole electric energy which is supplied to UPS system 3 by power supply 4. This means, that in case of high total amounts of electric energy still considerable amounts of heat energy are emitted within housing 6. By cooling air being circulated within housing 6, these amounts of heat energy are transferred to a cooling medium in a heat exchanger 7. The cooling medium is led through pipes 8 to a heat exchanger 9 which transfers the heat energy from the cooling medium to air 2 in the surroundings of the building, and which is, to this end, located outside or at the outside of the respective building. The cooling medium which is now cooled down again is led back from heat exchanger 9 to heat exchanger 7. A circulating pump 10 is provided for circulating the cooling medium through pipes 8 and heat exchangers 7 and 9.

The operation mode of UPS system and its associated cooling devices described up to here corresponds to the standard operation mode of UPS system 3. If the heat exchanger 7 fails, because it is defective itself or because it is not provided with sufficient cold cooling medium, UPS system 3 is transferred into an emergency operation mode in which cooling air circulated within housing 6 is no longer blown out into the heat exchanger 7 but directly into the surroundings 28 of UPS system 3 within inner room 1 and in which new cooling air is sucked out of the surroundings 28 into housing 6. As a result, the surroundings 28 of UPS system 3, i.e. the volume of inner room 1, are heated up. In this way, no permanent operation of UPS system is possible. However, the gained extra time, before an over-heating of UPS system 3 is imminent, is sufficient to, for example, safely shut down a computer system as a load 5. Feet 11 of the UPS system 3 serve for keeping a distance between housing 6 and heat exchanger 7, on the one hand, and the floor 12 of inner room 1, on the other hand, so that even liquid cooling medium leaking out of the pipes 8 or the heat exchanger 7 does not endanger the function of UPS system 3 in its emergency operation mode.

Figure 2:
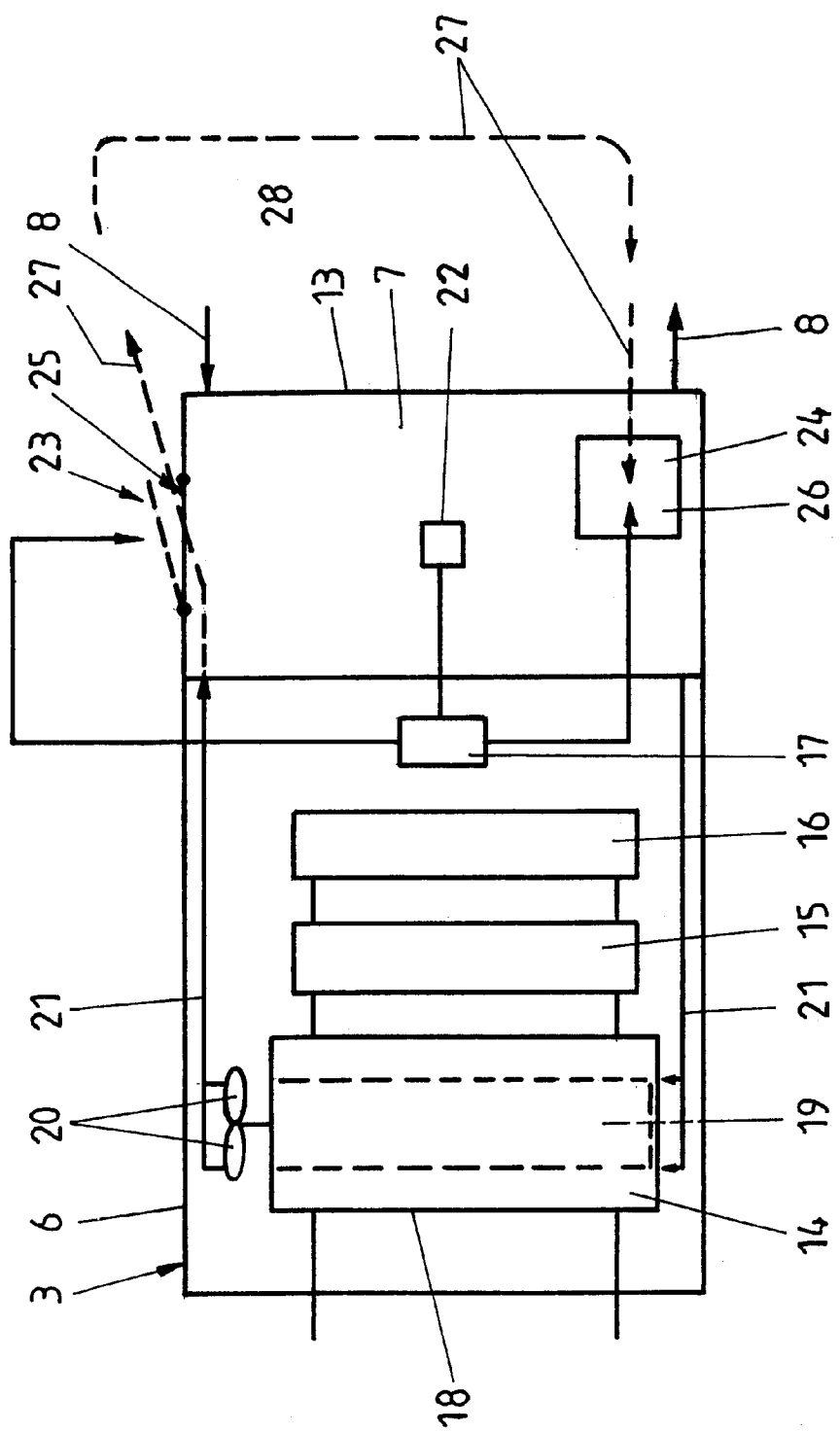
FIG. 2 shows the general inner construction of the new UPS system.

FIG. 2 shows in a strongly simplified manner the construction of UPS system 3 within housing 6 as well as within a heat exchanger housing 13 of heat exchanger 7. Several electrical and electronic components are located within housing 6 through some of which a power current is flowing. An electrical machine 14 as well as further components 15 and 16 are belonging to these components. Through a control unit 17 for switching UPS system 3 from its standard operation mode into its emergency operation mode no power current but only supply and control currents are flowing. Electrical machine 14 has a stator 18 and a rotor 19. Rotor 19 serves as a flywheel of a kinetic energy storage system in which the electrical machine 14 is operated as a motor. If power supply 4 breaks down, electrical machine 14 is operated as a generator to recover the kinetic energy stored in rotor 19 as electric energy. Cooling air transport blades 20 are attached to rotor 19 of electrical machine 14 which permanently turn around with rotor 19 and which serve for transporting cooling air 21 through housing 6. Thus, only by means of cooling air transport blades 20 cooling air 21 is sucked into housing 6, circulated within housing 6 and blown out of housing 6 again. Cooling air 21 is blown out into heat exchanger 7 the housing 13 of which is directly and sealed attached to housing 6. Cooling air 21 cooled down in heat exchanger 7 is then sucked back into housing 6. If a temperature sensor 22 at heat exchanger 7, i.e. a temperature sensor 22 directly arranged within heat exchanger 7, on heat exchanger 7 or somewhere at the pipes 8, detects a temperature which is above a predetermined threshold value, control unit 17 opens traps 23 and 24 which normally close an cooling air outlet port 25 and a cooling air intake port 26. Cooling air outlet port 25 is located in the cooling air entry region of heat exchanger housing 13 whereas cooling air intake port 26 is in the cooling air exit region of housing 13. Both cooling air ports 25 and 26 could also be provided directly in housing 6 containing the electrical and electronic components 14 to 17. By means of their arrangement in heat exchanger housing 13, however, it is particularly simple to equip existing UPS systems having primary air cooling with a heat exchanger and to provide an emergency operation mode according to the invention. Control unit 17 can also be provided within heat exchanger housing 13. Modifying an existing control unit in housing 6 or providing an additional control unit 17 there, however, is no problem. Dashed arrows 27 indicate the flow of cooling air 21 through the surroundings 28 of UPS system 3 within inner room 1. However, only during operation of UPS system 3 according the emergency operation mode the circuit of cooling air 21 is open in that way.

| LIST OF REFERENCE NUMERALS | |
|---|---|
| 1 | inner room |
| 2 | air |
| 3 | UPS-system |
| 4 | AC power supply |
| 5 | load |
| 6 | housing |
| 7 | heat exchanger |
| 8 | pipe |
| 9 | heat exchanger |
| 10 | circulating pump |
| 11 | foot |
| 12 | floor |
| 13 | heat exchanger housing |
| 14 | electrical machine |
| 15 | electrical component |
| 16 | electronic component |
| 17 | control unit |
| 18 | stator |
| 19 | rotor |
| 20 | cooling air transport blade |
| 21 | cooling air |
| 22 | temperature sensor |
| 23 | trap |
| 24 | trap |
| 25 | cooling air intake port |
| 26 | cooling air outlet port |
| 27 | arrow |
| 28 | surroundings |

What we claim is:

1. An uninterruptible power supply (UPS) system to be inserted between a alternating current (AC) power supply, interruptions of which are to be compensated for, and at least one load, which is to be supplied with alternating current (AC) or direct current (DC), the system comprising:

a housing;

at least one electrical or electronic component located within the housing, electric energy being partially transformed into heat energy upon a power current flowing through said electrical or electronic component;

cooling air transport means for sucking cooling air into the housing, for circulating the cooling air within the housing and for blowing the cooling air out of said housing to remove the heat energy;

a passive heat exchanger for withdrawing the heat energy from the cooling air being blown out of said housing and for transferring the heat energy into another cooling medium; and control means switching the UPS system from a first operation mode into a second operation mode, when a temperature sensor at the heat exchanger detects a temperature which is above a predetermined threshold value;

in the first operation mode of the UPS system, the cooling air blown out of said housing entering said passive heat exchanger and then being sucked out of the heat exchanger back into the housing;

said housing, said heat exchanger and any pipes inserted there between being sealed against the surroundings in the first operation mode; and in the second operation mode of the UPS system the cooling air being blown out of the housing into the surroundings of the housing and then being sucked out of the surroundings of the housing back into the housing;

wherein said housing and said heat exchanger are located within an inner room of a building, the surroundings of the housing being limited to the volume of the inner room; and wherein said heat exchanger is connected to a standard heat removal system of the building.

2. The system of claim 1, wherein the cooling medium is a cooling liquid.

3. The system of claim 2, wherein the cooling liquid is water.

4. The system of claim 1, wherein the standard heat removal system of the building comprises a heat exchanger exchanging the heat energy with air in the surroundings of the building.

5. The system of claim 1, wherein said electrical component, through which the power current is flowing, is a permanently driven electrical machine having a stator and a rotor.

6. The system of claim 5, wherein the rotor of said electrical machine is provided with cooling air transport blades which as parts of said cooling air transport means.

7. The system of claim 6, wherein the cooling air transport blades are the only moving parts of said cooling air transport means.

8. The system of claim 1, wherein said heat exchanger for the cooling air has a heat exchanger housing which is directly attached to the housing containing the electrical or electronic component.

9. The system of claim 1, wherein said heat exchanger for the cooling air has a heat exchanger housing which has, at the cooling air entering end, an intake port, and, at the cooling air leaving end, an outlet port, both ports being openable by said control means and leading into the surroundings of the housing.

* * * * *